United States Patent [19]
Slade

[11] Patent Number: 4,800,377
[45] Date of Patent: Jan. 24, 1989

[54] SPEED REDUCING SIGNAL

[76] Inventor: Charles E. Slade, 103 E. Walker St., Augusta, Ga. 30901

[21] Appl. No.: 52,534

[22] Filed: May 20, 1987

[51] Int. Cl.[4] ............................................. B60Q 1/26
[52] U.S. Cl. ..................................... 340/72; 324/161; 340/62
[58] Field of Search ................... 340/71, 72, 81 R, 62, 340/74, 84; 324/161, 166, 168; 307/10 LS

[56] References Cited

U.S. PATENT DOCUMENTS

| | | | |
|---|---|---|---|
| 3,691,525 | 9/1972 | McClellan, Sr. et al. | 324/166 X |
| 3,790,932 | 2/1974 | Ridpath | 340/71 |
| 4,162,445 | 7/1979 | Campbell | 324/166 |
| 4,368,427 | 1/1983 | Hayashi et al. | 324/161 |

FOREIGN PATENT DOCUMENTS 2175462 11/1986 United Kingdom .................. 340/71

Primary Examiner—Joseph A. Orsino
Assistant Examiner—Jeffery A. Hofsass
Attorney, Agent, or Firm—Hurt, Richardson, Garner, Todd & Cadenhead

[57] ABSTRACT

Rear warning lights on a vehicle are actuated in response to vehicular speed. When energized below a predetermined vehicular speed threshold, the warning lights will begin to flash alternately. The rate of flashing may be fixed so that each warning light flashes on briefly and at a fixed rate or it may be set to flash at a rate related to vehicular speed so that each warning light stays on longer as the vehicle speed decreases. At some very low vehicular speed, corresponding substantially to a full stop, the flashing may be set to cease so that one of the warning lights will glow steadily.

6 Claims, 3 Drawing Sheets

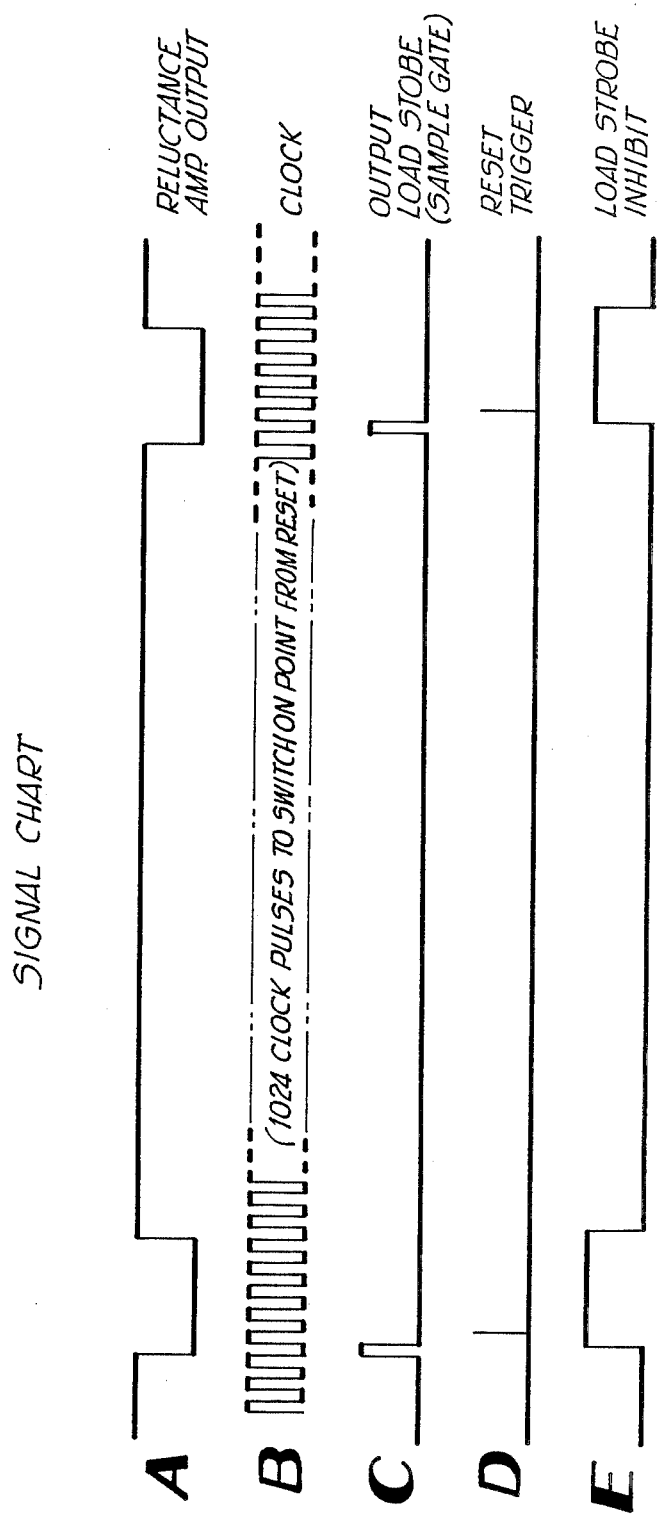

SPEED REDUCING SIGNAL

BACKGROUND OF THE INVENTION

There are many situations in vehicular traffic wherein a useful safety device would be provided if a slowing vehicle, even though its brake system is not being operated, would warn following cars of a significant decrease in speed. Currently, many truckers utilize the so called "hazard" lights: when the truck is moving at slow speed, for example, on a long grade or incline, to flash the vehicular rear brake lights in a fixed periodic fashion to warn those behind them that the truck is operating at a much lower than normal speed. In fact, most automobiles are provided with a hazard light system which similarly may be actuated manually to provide adequate warning to those behind either that the vehicle is progressing at a very low rate of speed or has stopped.

Applicant is aware of the following patents which relate generally to the subject matter of this invention:

| | |
|---|---|
| 3,500,091 | Jones |
| 3,691,525 | McClellan et al |
| 3,805,161 | Bayha et al |
| 3,906,345 | Bertolasi |
| 3,045,738 | Buzzell |
| 4,162,445 | Campbell |
| 4,243,938 | Bliven et al |

BRIEF SUMMARY OF THE INVENTION

The present invention is directed to a system to apprise drivers behind a particular vehicle when the vehicle has decreased its speed below a preset or predetermined threshold. The warning preferably is effected by means of two additional warning lights at the rear of the vehicle which alternately flash on and then off when the vehicular speed has dropped below the preset threshold. These additional warning lights may be, for example, of yellow color or, alternatively, the warning system may be integrated into the usual stoplight system of the vehicle in much the same manner as the warning light control normally employed.

At any rate, the system of this invention includes a speed responsive pick-up system, preferably a reluctance or pick-up coil cooperative with a permanent magnet mounted on a rotating part of the vehicle, preferably the drive shaft, an axle or the like. This circuitry, then, outputs a speed responsive pulse train which coordinates the system with the vehicular speed. In a cooperative circuit, the frequency of an oscillator is preset which drives a counting means. This constitutes a fixed time base for the system. So long as the counter means counts a predetermined number of counts of the oscillator in between outputs of the speed responsive circuitry, logic circuitry means connecting the two systems will automatically be reset so that the warning lights are not actuated. However, when the speed responsive output falls below the preset level determined by the setting of the oscillator, the reset function is not operative and the logic circuitry will cause the warning lights alternately to flash on and off. The flashing rate may be controlled by an internal jumper either to flash at a fixed rate determined by the counter means or the flashing rate may be variable in accord with the vehicular speed, in which case each warning light will remain "on" for a progressively greater period of time as the vehicular speed decreases but the flashing rate will diminish directly proportional to the vehicular speed.

Additionally, the invention incl.udes further logic circuitry means which, responsive to a still further count of the counter means, causes one of the warning lights to remain lit when the vehicular speed is less than some predetermined threshold which corresponds substantially to a full stop of the vehicle. Of course, if the operator actuates the brake system of the vehicle at any time during the operation of the speed responsive circuit, the normal stop lights will glow in normal fashion although the additional warning lights also will operate, thereby giving the following vehicle or vehicles further warning of the speed condition of the vehicle ahead.

BRIEF DESCRIPTION OF THE DRAWING FIGURES

FIG. 1A and FIG. 1B illustrate the circuit diagram of a preferred embodiment of the invention; and FIG. 2 shows signal waveforms at various portions of the circuitry of FIGS. 1A and 1B, as indicated thereon.

DETAILED DESCRIPTION OF THE INVENTION

Figure 1A:
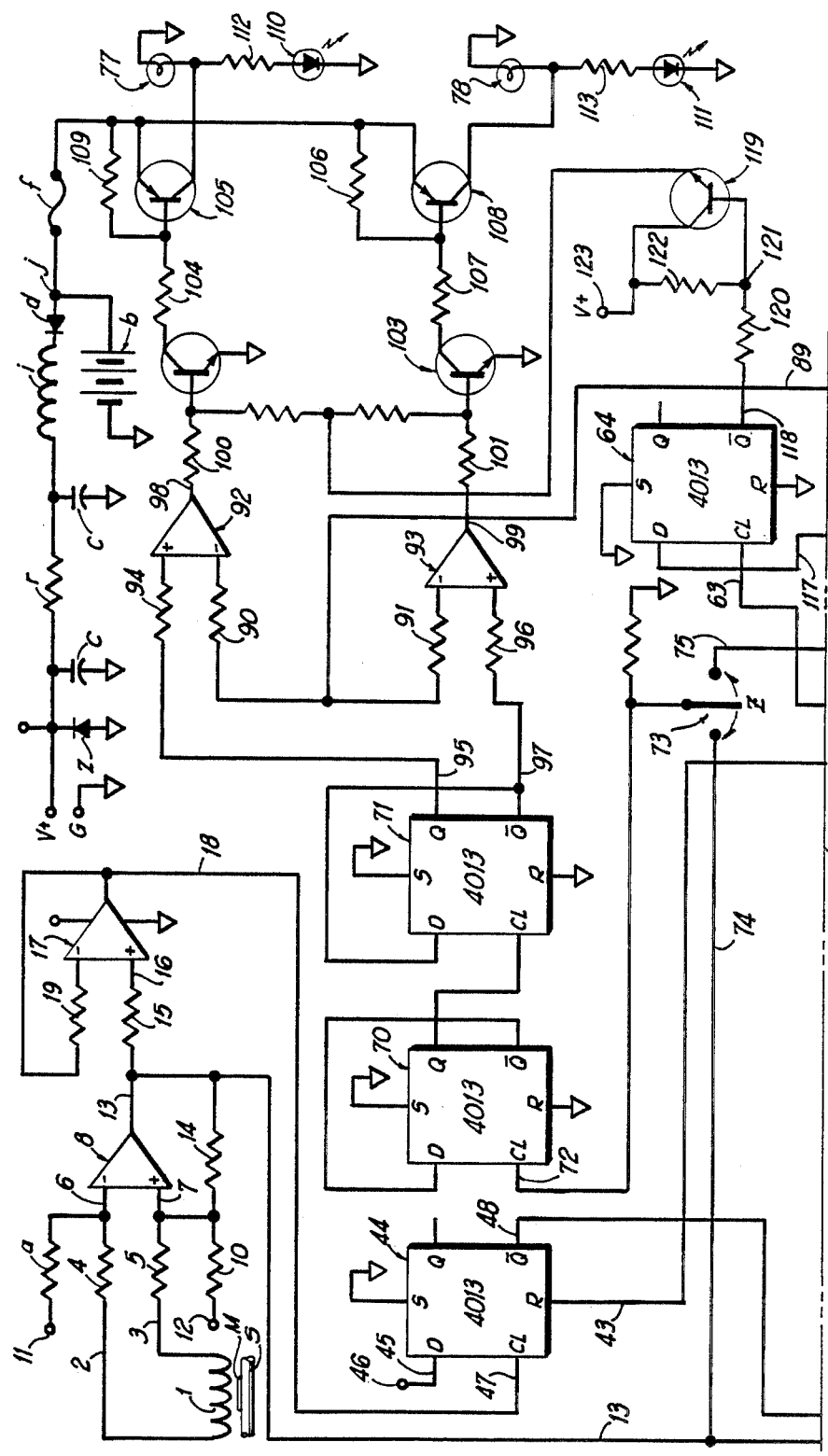

The power supply for the circuitry of this invention is stabilized from the vehicular system. The vehicle battery b is connected between the ground and the junction j and through the fuse f to provide current paths to the various transistors 102, 103, 105 and 108 and for the two warning lights 77 and 78 and their corresponding indicator LEDs 110 and 111. The stabilized positive voltage supply for the various ICs is provided through the protective diode d, the filtering inductance i and the current limiting resistor r and across the filtering capacitors c and the voltage limiting Zener diode z to provide the regulated 10V supply across the positive ten volt supply terminal V+ and the ground terminal g.

The vehicle with which the system of this invention is associated is provided with one or more permanent magnets M on the rotary shaft S whose rotational speed is proportional to vehicular speed. Therefore, the shaft S may be the normal drive shaft of a rear driven vehicle or it may one of the axles of a front wheel drive vehicle, or the like. The circuitry of this invention includes a pick-up inductance coil 1 by which the permanent magnets M sweep at a frequency dictated by the vehicular speed. The connectors 2 and 3 at the opposite ends of this coil are connected to identical resistors 4 and 5 respectively to the inverting input conductor 6 and the non-inverting conductor 7 of the operational amplifier indicated generally by the reference character 8. Two further identical resistors 9 and 10 are connected to plus voltage source at 11 and 12 and the output conductor at 13 of the amplifier 8 is connected back through a feedback resistor 14 to the non-inverting input conductor 7, substantially as is shown. Consequently, the normal condition of the signal at 13 is high but will go low for a brief period of time as the magnet M sweeps past the pick-up coil 1. An ideal waveform at the conductor 13 is indicated at A in FIG. 2. To provide a delay signal, the purpose of which will be presently apparent, the output conductor 13 is connected through the resistor 15 to the non-inverting input conductor 16 of the operational amplifier 17. The output conductor 18 of this amplifier is connected in feedback by a resistor 19 identical to the resistor 15 so that the waveform at the conductor 18 is identical to that at the output 13 but delayed slightly as a natural consequence of the buffer effect of the amplifier 17.

Figure 1B:
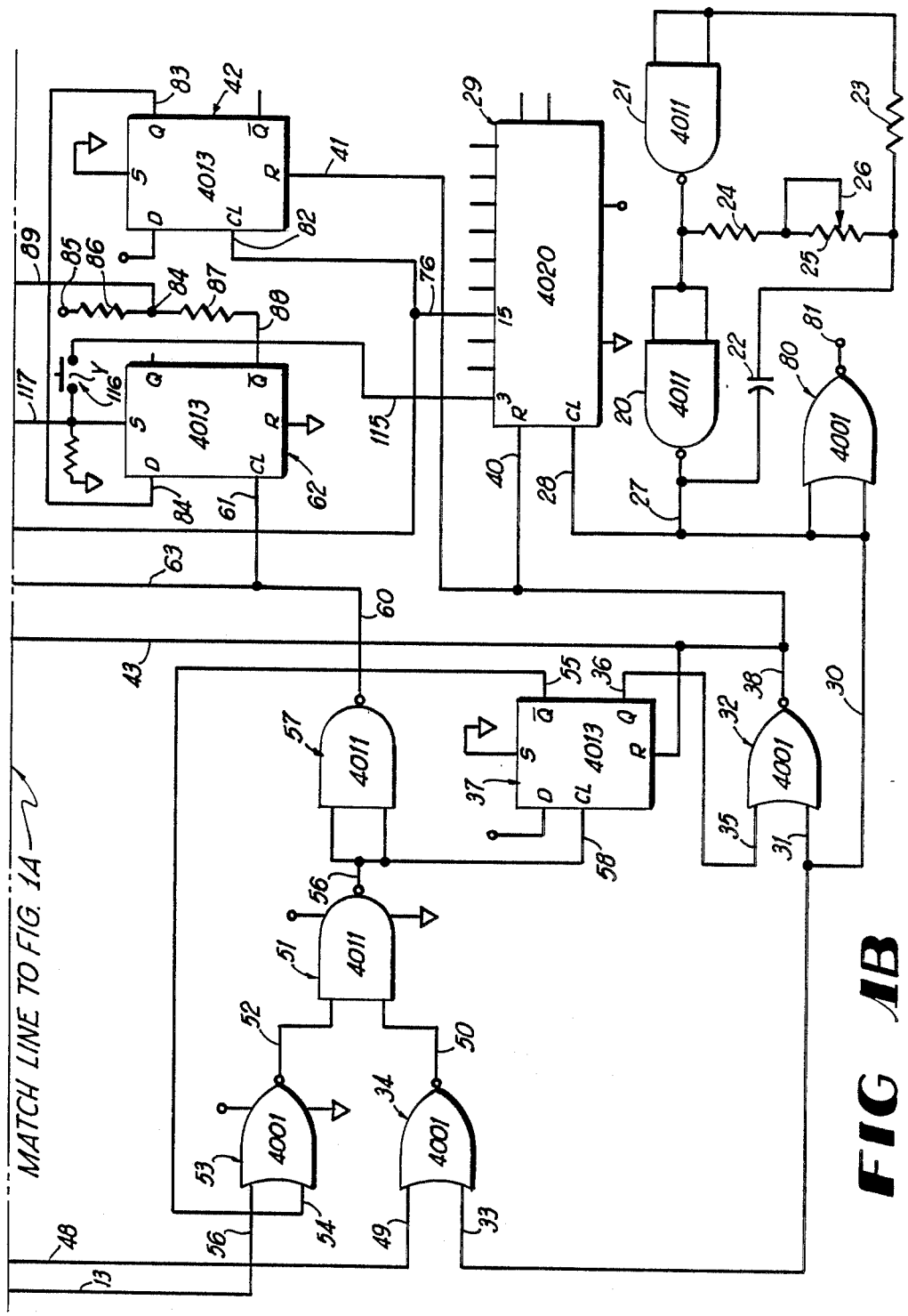

Referring more particularly to the lower right-hand portion of FIG. 1B, an oscillator is formed by the two NAND gates 20 and 21 connected in conventional oscillator configuration, including the timing capacitor 22, the resistor 23 and the resistor chain 24 and 25. The resistor 25 is in the form of a variable resistor habing a movable tap 26 which is set at a value corresponding to a particular speed threshold of the vehicle. Thus, the output at the conductor 27 has an idealized waveform as indicated at B in FIG. 2, the frequency of this clock or oscillator signal being determined by the setting of the movable tap 26 as aforesaid.

The clock output at 27 is connected over the conductor 28 to the clock input of the counter 29 and over the conductor 30 to the input conductor 31 of the NOR gate 32 and over the conductor 33 to the further NOR gate 34. The second input conductor 35 to the NOR gate 32 is connected to the Q output 36 of the flip-flop 37 so that, under appropriate conditions hereinafter described, the output at the conductor 38 of the NOR gate 32 produces a reset trigger whose ideal waveform is indicated at D in FIG. 2. This reset trigger is connected to the reset conductor 39 of the flip-flop 37, to the reset conductor 40 of the counter means 29, to the reset conductor 41 of the flip-flop 42 and to the rese conductor 43 of the flip-flop 44 (FIG. 1A).

The flip-flop 44 has its D input conductor 45 connected to positive voltage at 46 and its clock input conductor 47 connected to the output conductor 18 of the operational delay amplifier 17. The Q output conductor 48 of the flip-flop 44 is connected as the other input at 49 to the NOR gate 34. Thus, the gate 34 is not enabled until after the slight delay caused by the buffer 17. The output conductr 50 of the NOR gate 34 is connected as one input to the NAND gate 51 whereas the other input at 52 to the NAND gate 51 is from the output of the NOR gate 53. One input to the NOR gate 53 is at the conductor 54 which is connected to the Q output conductor 55 of the flip-flop 37 whereas the other input conductor 56 to the NOR gate 53 is connected to the output conductor 13 of the amplifier 8. Thus, the normal condition of the NOR gate 53 at its output 52 is such as to disable the NAND gate 51 but this NAND gate is enabled by the output of the gate 53 as soon as the signal at the conductor 13 goes low. Thereafter, before the delayed signal E goes high, In response to the clock signal B at the input 33 of the gate 34, an output will be produced at the conductor 56 at the output of the NAND gate 51 to trigger the NAND gate 57 and also, over the conductor 58, to clock the flip-flop 37. The input 35 to the gate 32 is now enabled so that the clock B produces the reset signal D. This then disables the gate 32 and once again enables the gate 53. However, the gate 34 has in the meantime been disabled by the signal E. The output of the NAND gate 57 at the conductor 60 is of the idealized waveform shown at C in FIG. 2 and is connected at the conductor 61 as the clock input to the flip-flop 62. This output signal is also connected at the clock input conductor 63 of a further flip-flop 64, the purpose of which will be presently apparent.

Two further flip-flops 70 and 71 are provided in the circuitry which are connected as shown to function as a two bit divider circuitry with the clock input to this circuitry being provided at the conductor 72 which is connected to a switch or jumper 73 either to the conductor 74 connected to the outptt conductor 13 of the amplifier 8, or to the conductor 75 which is connected to the count output conductor 76 of the counter means 29. The rate at which the flip-flop 70 is toggled, divided by two is the rate at which the warning lights 77 and 78 alternately will flash on and off.

The flip-flops 44 and 71 are a type CD4013; the flip-flops 37 and 62 another type CD4013; the two flip-flops 70 and 42 are another type CD4013 and the flip-flop 64 is ½ of a CD4013. The NAND gates 51, 57, 20 and 21 are a type of CD4011 and the NAND gates 34,32,53 and the further NAND gate 80 are a type CD4001. The NOR gate 80 is utilized to provide a test point at the terminal 81.

The flip-flops 62 and 42 comprise a speed threshold detector circuitry. The output at the conductor 76 of the counter means 29 goes high after the accumulation of 1024 clock pulses (if no reset has occured) and this, in turn, provides a clock input at the conductor 82 to the flip-flop 42. The Q output at the conductor 83 of the flip-flop 42 is connected as the D input at the conductor 84 to the flip-flop 62 so that if the signal at the output conductor 60 of the NAND gate 57 does not appear before 1024 counts are accumulated by the counter means 29, the D input at the conductor 84 of the flip-flop 62 goes low and a lamp control circuit will remain unaffected. If, however, an output pulse appears at the conductor 60 before the timer means 29 has counted 1024 pulses to produce an output at the line 76, the flip-flop 62 is toggled so that the terminal or junction point 84 which is connected to the plus voltage terminal at 85 through the resistor 86 and through the resistor 87 to the Q output conductor 88 goes high, correspondingly to provide a high output at the conductor 89. The conductor 89 is connected through the resistors 90 and 91 respectively to the inverting input of the amplifier 92 and the inverting input of the amplifier 93. The non-inverting input to the amplifier 92 is connected through the resistor 94 to the Q output conductor 95 of the flip-flop 71 whereas the non-inverting input of the amplifier 93 is connected through the resistor 96 to the Q output conductor 97 of this same flip-flop 71. One or the other of the conductors 95 and 97 will be high so that one of the output conductors 98 or 99 of the two amplifiers 93 and 93 correspondingly will go high when the high signal appears on the conductors 89. These two output conductors are coupled through the resistors 100 and 101 respectively to the base electrodes of the two NPN transistors 102 and 103. Depending on which one of the conductors 98 or 99 goes high, one or the other of the transistors 102 or 103 will be switched on to draw current either through the resistor chain 109 and 104 to turn the PNP transistor 105 on or through the resistor chaim 106, 107 to turn the PNP transistor 108 on. Depending on which one of the transistors 105 or 108 is turned on, the corresponding warning light 77 or 78 likewise will be illuminated. Each of the lights 77 and 78 has an LED 110 or 111 associated with it, connected through the corresponding current limiting resistors 112 and 113. The LEDs 110 and 111 are provided for operator display.

If the output conductor at 76 of the counter means 29 does not go high before the next speed responsive output from the two amplifiers 8 and 17, the circuitry will be reset and the lights 77 and 78 will not be affected. If, however, the vehicular speed drops below the preset threshold, the counter means 29 will be permitted to recount because no reset pulse will appear at the conductor 40 and sometime subsequent to the output at the conductor 76, the output at the conductor 115 will go high. If the jumper connection at 116 is made, the high output at 115 will be connected through to the conductor 117 which toggles the flip-flop 64 so that its Q output at conductor 118 goes high. The conductor 118 is connected to the base electrode of the NPN device 119 through the resistor 120. The resistor junction 121 is connected through a further resistor 122 to a plus voltage terminal 123 also connected as the emitter electrode of the transistor 119. Thus, whichever of the lights 77 or 78 is on at the time the transistor 119 is turned on, will remain on to indicate that the vehicle has reached a low threshold of speed corresponding substantially to a full stop of the vehicle as indicated by the count accumulated on the conductor 115 of the counter means 29.

It will be appreciated that the setting of the variable resistor 25 which controls the oscillator frequency is an important function. That is to say, it determines the low speed threshold below which the warning lights will operate. Thus, during prolonged operation at low speeds (as in town) the warning lights may operate continously and this may be undesirable particularly if the jumper connection at 73 is not made to signal A. That is to say, under this condition there is no change of flashing rate even if the vehicle is being accelerated toward the threshold. With the jumper connection made at 73 to signal A, there would at least be a diminished duty cycle and more rapid flashing of the warning lights during such acceleration.

Therefore, it is preferred to provide an operator control for the resistor 25, suitably calibrated in miles per hour. The operator is always aware, through the LEDs 110 and 111 of the operation of the warning lights and will find it a simple matter to adjust the resistor 25 to the driving conditions at hand.

What is claimed is:

1. A speed reduction signaling apparatus for use in an automotive vehicle having an electrical power system and a rotatable mechanical system comprising:
   a speed responsive pickup system cooperative with a plurality of permanent magnets mounted on said rotatable mechanical system and which emits pulses at a rate responsive to said vehicle's speed;
   a timing circuit means for independently providing clock timing pulses at a predetermined rate and establishing speed threshold;
   logic circuitry means cooperative with said speed responsive pickup system and said timing circuit means for determining when said vehicle's speed has fallen below said speed threshold;
   a plurality of external lamp means cooperative with said logic circuitry means and which are caused to alternately flash on and off by said logic circuitry means whenever the rate of said pulses which are emitted by said speed responsive pickup system falls below said speed threshold; and
   electrical connections for receiving electrical energy for said speed responsive pickup system, said timing circuit means, said logic circuitry means, and said external lamp means and adapted for connection to said electrical power system.

2. The apparatus as claimed in claim 1 wherein the timing circuit means includes:
   a counter means having a clock pulse input for receiving timing pulses, a reset input, and a plurality of outputs;
   a variable oscillator means for emitting periodic electrical pulses at a predetermined rate to establish a speed threshold, and having an output coupled to said clock pulse input of said counter means and to a plurality of inputs in the said logic circuitry means; and
   oscillator adjustment means for varying the frequency of oscillator output.

3. The apparatus as claimed in claim 2 wherein the logic circuitry means further comprises:
   a speed threshold detector means for determining when the speed of the vehicle has dropped below a speed threshold value;
   a reset trigger means having a plurality of inputs and a single output coupled to the reset input of said counter means and the reset input of said speed threshold detector means;
   divider circuitry means for causing said plurality of external lamp means to flash alternately on and off;
   sampling means coupled to the output of the speed responsive pickup system and providing input signals to the divider circuitry means and speed threshold detector means;
   first switch means for connecting said divider circuitry means to a first output of the counter means to cause the plurality of external lamp means to alternately flash on and off at a fixed rate, or to said speed responsive pickup system to cause the plurality of external lamp means to flash on and off at a variable rate; and
   second switch means for connecting a second output of the counter means to one of said external lamp means whenever the output of said speed threshold detector means drops below a speed threshold value corresponding essentially to a full stop to keep said external lamp means on steadily.

4. The apparatus as claimed in claim 3 wherein the external lamp means includes:
   amplifier means having a first input connected to an output from the divider circuitry means, and a second input connected to an output from the speed threshold detector means, and an output;
   first transistor means having a base electrode input connected to the output of said amplifier means, and an output;
   second transistor means having a base electrode input connected to the output of said first transistor means, and an output;
   a lamp for external warning which is illuminated by output from said second transistor means; and
   a light emitting diode for operator display which is activated by output from said second transistor means.

5. The apparatus as claimed in claim 4 wherein the speed responsive pickup system further comprises:
   a reluctance pickup coil having two ends for producing an output pulse in response to a magnetic flux field caused by said permanent magnets;
   a first amplifier means having inverting and non-inverting inputs connected to opposite ends of said reluctance pick-up coil for producing a speed responsive output pulse;
   a second amplifier means having a non-inverting input connected to the output of said first amplifier means, and having an inverting input connected to the output for producing a delayed output signal; and a flip-flop having a clock input connected to the output of said second amplifier means, and an output for enabling the sampling means.

6. The apparatus as claimed in claim 5 wherein the sampling means includes combinational logic gates coupled to the speed responsive pickup system, and to the divider circuitry means and the speed threshold detector means, for producing an output pulse when enabled by the speed responsive pickup system.

* * * * *